United States Patent Office 3,351,571
Patented Nov. 7, 1967

3,351,571
BLENDS OF NATURAL OR SYNTHETIC RUBBER WITH POLYEPISULFIDE
Norman Singers Grace and Raymond Thomas Woodhams, Toronto, Ontario, Canada, assignors to Dunlop Rubber Company Limited, London, England, a British company
No Drawing. Filed Sept. 23, 1964, Ser. No. 398,739
Claims priority, application Great Britain, Oct. 19, 1963, 41,360/63; Feb. 27, 1964, 8,149/64
16 Claims. (Cl. 260—4)

This invention relates to polymeric compositions and particularly to vulcanized elastomeric compositions.

In current technological practice it is usually considered that elastomeric of greatly different unsaturation levels cannot be covulcanized effectively. The polymer with the higher amount of unsaturation takes up the vulcanizing agents preferentially, leaving the lower unsaturation polymer unvulcanized, or if a great excess of vulcanizing agents is employed the former polymer is grossly over-vulcanized.

However, it has now been found that polymers of different degrees of unsaturation can be covulcanized successfully if one of them is an unsaturated polyepisulphide. It has also been found that the covulcanizates of the present invention exhibit good oil- and solvent-resistances.

According to the present invention, a vulcanized elastomeric composition comprises the sulphur vulcanizate of a mixture of an unsaturated polyepisulphide and a sulphur-vulcanizable elastomer different therefrom.

According to the invention also, a vulcanizable elastomeric composition comprises an unsaturated polyepisulphide in admixture with a sulphur-vulcanizable elastomer different therefrom and sulphur or a compound which liberates sulphur under the vulcanization conditions.

According to the present invention also, a method of preparing a vulcanized elastomeric composition of the kind hereinbefore defined comprises blending an unsaturated polyepisulphide with a sulphur-vulcanizable elastomer different therefrom and sulphur or a compound which liberates sulphur under vulcanization conditions and vulcanizing the mixture by heating.

The present invention provides vulcanized elastomeric compositions which are based on a blend of a sulphur-vulcanizable unsaturated polyepisulphide and one or more other elastomers which can be vulcanized by sulphur. Typical unsaturated polyepisulphides which can be used are those described in U.S. application Serial No. 292,459, filed July 2, 1963, in which is described and claimed a polymer which comprises at least one saturated aliphatic episulphide and at least one unsaturated episulphide. The unsaturated polyepisulphides so described can be prepared by polymerizing at least one saturated aliphatic episulphide and an unsaturated episulphide in the presence of a polymerization catalyst which comprises a compound of a metal of Group IIB of the Mendeleeff Periodic Table. Preferably, the saturated episulphide to be used to produce the polymer should contain between 2 and 6 carbon atoms in the molecule, and examples of suitable episulphide monomers are ethylene sulphide, propylene sulphide and butylene sulphide. Mixtures of the various episulphides can be employed. When the polyepisulphide is to be prepared from a mixture of ethylene sulphide and propylene sulphide, then it is preferred to maintain the proportion of ethylene sulphide in the polymer at below 35 mole percent to ensure that the resultant polymer has rubbery characteristics. The unsaturated episulphide should contain at least one aliphatic carbon-carbon double bond in addition to the episulphide group, and examples of such compounds are allyloxypropyl episulphide (allyloxymethyl thiirane), butadiene monoepisulphide (vinyl thiirane), 1,5-hexadiene monoepisulphide, dimethylbutadiene monoepisulphide, piperylene monoepisulphide, isoprene monoepisulphide, 1,4-pentadiene monoepisulphide, and others which are described in the co-pending application referred to hereinbefore.

Generally, the unsaturated episulphide will constitute from 0.1 to 20 mole percent of the polymer, but preferably from 1 to 10 mole percent and the saturated episulphide (or mixture thereof) will form the major portion of the polymer.

In accordance with the present invention, the unsaturated polyepisulphide is mixed with one or more sulphur-vulcanizable elastomers. Examples of the sulphur-vulcanizable elastomers which can be mixed with the unsaturated polyepisulphide are natural rubber and synthetic rubbers, for example butyl rubber, neoprene rubber i.e. polychloroprene, cis-polybutadiene, terpolymers of ethylene and propylene with an unsaturated monomer to confer unsaturation on the terpolymer, copolymers of butadiene and styrene, and nitrile rubber i.e. copolymers of butadiene and acrylonitrile.

Sulphur and/or a compound which liberates sulphur under the vulcanization conditions is mixed with the vulcanizable composition and generally one or more accelerators are also mixed with the composition. The composition is vulcanized by heating to a temperature of, for example 200° F. to 350° F. until a desired physical property is at an optimum. Other compounding ingredients such as antioxidants, extender oils, antiozonants and fillers, can also be added to the composition prior to vulcanization.

The amount of the vulcanizing agents employed depends on the particular composition to be vulcanized, as is well-known.

The proportion of the polyepisulphide in the elastomeric composition can be from 1 to 99 percent by weight of the total elastomer content of the composition (i.e. the weight of the polyepisulphide plus the one or more other elastomers).

The vulcanized elastomeric compositions of the present invention have a wide variety of uses, such as in belting, pneumatic tyres or shoe-soles. The vulcanizable compositions can be shaped and vulcanized to give the shaped articles in the normal manner.

In the present invention it has been found that the unsaturated polysulphide rubbers can be blended and vulcanized with other elastomers irrespective of whether they are of high or low unsaturation values, and that, as judged by swelling in solvents and the proportion of extracts by solvents both elastomers have achieved a satisfactory degree of vulcanization.

Moreover, the covulcanizates of an unsaturated polyepisulphide and a sulphur-vulcanizable elastomer different therefrom exhibit oil- and solvent-resistances which are generally superior to the vulcanizates of the individual elastomers (other than vulcanized polyepisulphide). However, this property was found not to apply to some samples of covulcanizates of an unsaturated polyepisulphide and a terpolymer of ethylene, propylene and another compound which confers unsaturation on the terpolymer, when the terpolymer constitutes over 60 percent of the vulcanizable mixture. This anomaly is probably owing to poor blending of the elastomers in these particular samples.

The invention is illustrated in the following examples, in which all parts are by weight. In the examples, various terms are abbreviated for convenience and these are as follows:

*Elastomers*

PE=Polyepisulphide
BU=Butyl rubber, e.g. butyl 400
EPT=Ethylene/propylene terpolymer, e.g. Royalene 200 (ethylene/propylene/dicylopentadiene)
Ne=Neoprene rubber (polychloroprene), e.g. Neoprene W
NI=Nitrile rubber (butadiene/acrylonitrile) e.g. Krynac 800
NR=Natural rubber
PB=cis-Polybutadiene
PIB=Polyisobutylene, e.g. Vistanex
PPS=Saturated polypropylene sulphide
SBR=Copolymer of butadiene and styrene, e.g. Krylene

*Other vulcanization ingredients*

BTD=Altax (benzothiazyl disulphide)
DBP=Dibutyl phthalate
DEG=Diethylene glycol
DPG=Diphenyl guanidine
HAF=High abrasion furnace black
LCM=Light calcined magnesia
MBT=Captax (2-mercaptobenzthiazole)
N60=Necton 60 (a paraffin oil)
P=Polymer blend
S=Sulphur
SA=Stearic acid
TTD=Tuads (tetramethylthiuram disulphide)
TTM=Monex (tetramethyl-thiuran monosulphide)
ZO=Zinc oxide

*Oils and solvents*

Ace=Acetic acid
Car=Carbon tetrachloride
Cyc=Cyclohexane
Dib=Dibutyl phthalate
Dim=Dimethyl formamide
Eth=Ethylene glycol
$H_2O$=Water
HCl=6 Hydrochloric acid
Hep=Heptane
MEK=Methylethyl ketone
Met=Methanol
O1=Paraffinic oil
O2=Aromatic oil
T/H=50/50 toluene/hexane
Tet=Tetrahydrofuran
Thi=Thiophene
Tol=Toluene

*Physical properties*

100 Mo=Modulus (lb./sq. in.) at an elongation of 100 percent
300 Mo=Modulus (lb./sq. in.) at an elongation of 300 percent
EB=Percentage elongation at break
WH=Wallace hardness
TS=Tensile strength
Temp=Vulcanization temperature (° F.)
Time=Vulcanization time (min.)
X=Cross-link density (moles/cc.) $\times 10^4$
Y=Percentage soluble material

EXAMPLE I

This example illustrates the blending and vulcanizing of an unsaturated polyepisulphide with 5 percent by weight of a second elastomer. The polyepisulphide used in this example comprised 67 mole percent propylene sulphide, 24 mole percent ethylene sulphide and 9 mole percent allyloxypropyl episulphide.

Compositions of the polyepisulphide with a second elastomer were prepared as in Table I:

TABLE I

|     | A | B | C | D | E | F |
|-----|---|---|---|---|---|---|
| PE  | 100 | 100 | 100 | 100 | 100 | 100 |
| HAF | 50 | 50 | 50 | 50 | 50 | 50 |
| ZO  | 5 | 5 | 5 | 5 | 5 | 5 |
| SA  | 2 | 2 | 2 | 2 | 2 | 2 |
| NR  | 5 | | | | | |
| SBR | | 5 | | | | |
| EPT | | | 5 | | | |
| NE  | | | | 5 | | |
| PB  | | | | | 5 | |
| NI  | | | | | | 5 |
| S   | 2 | 2 | 2 | 2 | 2 | 2 |
| TTD | 1 | 1 | 1 | 1 | 1 | 1 |
| MBT | 0.5 | 0.5 | 0.5 | 0.5 | 0.5 | 0.5 |

The compositions were vulcanized at 307° F. for 6 minutes for one sample, and 12 minutes for another. The physical properties of the vulcanized samples were measured and are listed in Table II:

TABLE II

| Sample | Time | 100 Mo | 300 Mo | TS | EB | WH |
|--------|------|--------|--------|-----|-----|-----|
| A | 6 | 600 | 1,560 | 1,680 | 300 | 77 |
|   | 12 | 760 |  | 1,600 | 200 | 80 |
| B | 6 | 560 | 1,440 | 1,500 | 300 | 78 |
|   | 12 | 800 |  | 1,640 | 200 | 80 |
| C | 6 | 480 | 1,280 | 1,480 | 350 | 77 |
|   | 12 | 760 |  | 1,640 | 215 | 80 |
| D | 6 | 450 | 1,240 | 1,580 | 400 | 75 |
|   | 12 | 740 |  | 1,840 | 225 | 80 |
| E | 6 | 560 | 1,320 | 1,400 | 300 | 78 |
|   | 12 | 760 |  | 1,400 | 210 | 80 |
| F | 6 | 600 | 1,600 | 1,600 | 300 | 78 |
|   | 12 | 760 |  | 1,640 | 200 | 80 |

All of the elastomers tested showed good compatibility with the polyepisulphide.

EXAMPLE II

In this example the polyepisulphide used in Example I was blended and vulcanized with proportions of polychloroprene (Neoprene W), varying from 10 to 50 percent by weight of the blend.

Compositions were prepared as listed in Table III:

TABLE III

|     | G | H | I | J | K | Control |
|-----|---|---|---|---|---|---------|
| PE  | 90 | 90 | 70 | 60 | 50 | 100 |
| NE  | 10 | 20 | 30 | 40 | 50 |  |
| ZO  | 5.5 | 6.0 | 6.5 | 7.0 | 7.5 | 5 |
| LCM | 0.4 | 0.8 | 1.2 | 1.6 | 2.0 |  |
| HAF | 50 | 50 | 50 | 50 | 50 | 50 |
| SA  | 2 | 2 | 2 | 2 | 2 | 2 |
| DEG | 2.5 | 2.5 | 2.5 | 2.5 | 2.5 | 2.5 |
| S   | 2 | 2 | 2 | 2 | 2 | 2 |
| TTD | 0.9 | 0.8 | 0.7 | 0.6 | 0.5 | 1 |
| MBT | 0.5 | 0.5 | 0.5 | 0.5 | 0.5 | 0.5 |

These compositions were vulcanized at 307° F. for 10 minutes. The physical properties of the vulcanized samples are listed in Table IV:

TABLE IV

|        | G | H | I | J | K | Control |
|--------|---|---|---|---|---|---------|
| 100 Mo | 720 | 710 | 700 | 800 | 650 | 720 |
| TS     | 1,850 | 2,000 | 2,020 | 2,360 | 2,360 | 1,600 |
| EB     | 240 | 250 | 250 | 230 | 270 | 210 |
| WH     | 77 | 76 | 76 | 76 | 79 | 82 |

Addition of small quantities of Neoprene W improves the physical properties of polyepisulphides considerably.

EXAMPLE III

This example illustrates the blending and vulcanizing of a polyepisulphide with a second elastomer so that the blend contains 50 percent by weight of each elastomer. The polyepisulphide used was the same as for Examples I and II.

Compositions were prepared as shown in Table V:

TABLE V

|     | L   | M   | N   | O   | P   |
| --- | --- | --- | --- | --- | --- |
| PE  | 50  | 50  | 50  | 50  | 50  |
| NR  | 50  |     |     |     |     |
| SBR |     | 50  |     |     |     |
| NI  |     |     | 50  |     |     |
| EPT |     |     |     | 50  |     |
| PB  |     |     |     |     | 50  |
| ZO  | 5   | 5   | 5   | 5   | 5   |
| SA  | 2   | 2   | 2   | 2   | 2   |
| DEG | 2.5 | 2.5 | 2.5 | 2.5 | 2.5 |
| HAF | 50  | 50  | 50  | 50  | 50  |
| S   | 2   | 2   | 2   | 2   | 2   |
| BTD | 1   | 1   | 1   | 1   | 1   |
| TTD | 0.4 |     | 0.3 | 0.3 | 0.3 |
| DPG |     | 0.5 |     |     |     |

These compositions were vulcanized at 307° F. for 10 minutes. The physical properties of the covulcanizates are shown in Table VI:

TABLE VI

|        | L     | M     | N     | O     | P     |
| ------ | ----- | ----- | ----- | ----- | ----- |
| 100 Mo | 720   | 520   | 880   | 380   | 500   |
| 300 Mo | 2,080 |       |       |       |       |
| TS     | 2,160 | 1,560 | 1,580 | 840   | 1,340 |
| EB     | 300   | 275   | 180   | 250   | 260   |
| WH     | 75    | 70    | 76    | 68    | 76    |

EXAMPLE IV

This example describes blends and vulcanizates of a polyepisulphide with a second elastomer such that the blend contains less than 50 percent by weight of the second elastomer. The polyepisulphide used in these blends comprised 57 mole percent propylene sulphide, 39 mole percent ethylene sulphide and 4 mole percent allyloxypropyl episulphide.

Compositions were prepared as shown in Table VII:

TABLE VII

|     | Q   | R   | Control |
| --- | --- | --- | ------- |
| PE  | 80  | 90  | 100     |
| BU  | 20  |     |         |
| EPT |     | 20  |         |
| SA  | 2   | 2   | 2       |
| ZO  | 5   | 5   | 5       |
| HAF | 50  | 50  | 50      |
| S   | 2   | 2   | 2       |
| TTD | 1   | 1   | 1       |
| MBT | 0.5 | 0.5 | 0.5     |

These compositions were vulcanized at 307° F. The physical properties obtained are shown in Table VIII:

TABLE VIII

|        | Q     | R     | Control |
| ------ | ----- | ----- | ------- |
| Time   | 20    | 40    | 20      |
| 100 Mo | 400   | 380   | 960     |
| 300 Mo | 1,040 | 1,080 |         |
| TS     | 1,880 | 2,120 | 2,080   |
| EB     | 530   | 600   | 240     |
| WH     | 71    | 71    | 82      |

EXAMPLE V

This example illustrates that unsaturated polyepisulphide elastomers are vulcanizable with natural rubber as shown by cross-link density measurements. In this example, the unsaturated polyepisulphide comprised 67 mole percent propylene sulphide, 24 mole percent ethylene sulphide and 9 mole percent allyloxypropyl episulphide.

Samples of polyepisulphide, natural rubber, 50/50 (by weight) of polyepisulphide with natural rubber and 50/50 (by weight) of a saturated polypropylene sulphide with natural rubber were compounded according to the formula given below and vulcanized by heating for 20 minutes at 307° F. The vulcanization recipe is as shown in Table IX, all parts being parts by weight:

TABLE IX

| Polymer | 100 |
| --- | --- |
| Zinc oxide | 5 |
| Stearic acid | 2 |
| Sulphur | 2 |
| Benzothiazyl disulphide | 1 |
| Tetramethylthiuram disulphide | 0.3 |

Duplicate samples of these vulcanizates were swollen to equilibrium conditions in toluene to determine cross-link density and percentage soluble material. In this experiment, an antioxidant was not added to the swelling solvent. The results are shown in Table X:

TABLE X

|   | PE  | NR  | NR/PE | NR/PPS |
| - | --- | --- | ----- | ------ |
| X | 1.5 | 0.1 | 0.5   | 0.06   |
| Y | 10  | 22  | 9     | 59     |

It can be readily seen that unsaturated polyepisulphide is vulcanizable with natural rubber.

EXAMPLE VI

In this example, the procedure described in Example V was repeated, except that phenyl-beta-naphthylamine was added to the toluene to reduce oxidation during the swelling operation, and reduce time to equilibrate.

The cross-link densities and percentage soluble material in the vulcanizate are shown in Table XI:

TABLE XI

|   | PE  | NR  | PE/NR |
| - | --- | --- | ----- |
| X | 1.4 | 0.7 | 0.9   |
| Y | 0.8 | 2   | 4     |

The higher value of cross-link density in the natural rubber vulcanizate over that in Example V is owing to decreased oxidative degradation during swelling.

EXAMPLE VII

This example illustrates the failure of butyl rubber and natural rubber, or polyisobutylene (Vistanex) and natural rubber to covulcanize.

These samples were blended and compounded as shown in Table XII, all parts being parts by weight:

TABLE XII

| Polymer | 100 |
| --- | --- |
| Zinc oxide | 5 |
| Stearic acid | 2 |
| Sulphur | 1.5 |
| Tetramethylthiuram disulphide | 1.0 |
| 2-mercaptobenzthiazole | 0.5 |

The samples were then vulcanized at 307° F. for 30 minutes.

Swelling in toluene indicates that vulcanization does not occur, as shown in Table XIII:

TABLE XIII

|   | BU  | NR  | NR/BU | NR/PIB |
| - | --- | --- | ----- | ------ |
| X | 0.8 | 1.0 | 0.4   | 0.4    |
| Y | 4.5 | 2.1 | 42    | 46     |

EXAMPLE VIII

This example illustrates the improved oil- and solvent-resistances of covulcanizates in accordance with the present invention over the vulcanizates of the individual elastomers other than vulcanized polyepisulphide.

Several black-loaded covulcanizates of a polyepisulphide (PE) comprising 68 mole percent propylene sulphide, 26 mole percent ethylene sulphide and 6 mole percent allyloxypropyl episulphide, with other conventional elastomers were tested by swelling in various solvents. The other elastomers were NR, SBR, BU, NI, EPT, PB and NE.

The elastomers were compounded and cured as shown in Table XIV, all parts being parts by weight:

TABLE XIV

|  | NR, SBR, BU or PB | EPT | NI | NE |
|---|---|---|---|---|
| P | 100 | 100 | 100 | 100 |
| HAF | 50 | 50 | 50 | 50 |
| ZO | 5 | 5 | 5 | 10 |
| SA | 2 | 2 | 2 | 2 |
| DEG | 2.5 | | 2.5 | 2.5 |
| DBP | | | | 10 |
| N60 | | 20 | | |
| LCM | | | | 4 |
| S | 2 | 2 | 2 | 0.5 |
| TTM | 1 | 1 | 1 | 0.5 |
| MBT | 0.5 | 0.5 | 0.5 | 0.5 |
| Temp | 307 | 307 | 307 | 307 |
| Time | 10 | 30 | 10 | 10 |

Small samples (about 0.2 gm.) of each of the vulcanizates and covulcanizates were immersed separately in seventeen different solvents for two weeks at room temperature. The samples were weighed before and after immersion so that weight difference, $d$, was assumed to be due to absorbed solvent. The percent volume swells of the vulcanized samples (%V) were calculated according to the equation:

$$\%V = d/w \times r/s \times 100/f$$

in which $f$ = weight fraction of elastomer in vulcanized compound
$w$ = original weight of sample
$r$ = specific gravity of elastomer
$s$ = specific gravity of solvent The results are listed in Tables XV and XVa.

TABLE XV

| | Sample No. | | | | | | | | | | |
|---|---|---|---|---|---|---|---|---|---|---|---|
| | 1 | 2 | 3 | 4 | 5 | 6 | 7 | 8 | 9 | 10 | 11 |
| PE | 100 | | | | | | | | 20 | 50 | 20 |
| NR | | 100 | | | | | | | 80 | 50 | |
| SBR | | | 100 | | | | | | | | 80 |
| NI | | | | 100 | | | | | | | |
| BU | | | | | 100 | | | | | | |
| EPT | | | | | | 100 | | | | | |
| NE | | | | | | | 100 | | | | |
| PB | | | | | | | | 100 | | | |

| | Volume Swell (%V) | | | | | | | | | | |
|---|---|---|---|---|---|---|---|---|---|---|---|
| Solvents: | | | | | | | | | | | |
| Hep | 12 | 225 | 125 | 8 | 325 | 340 | 85 | 120 | 155 | 105 | 94 |
| Cyc | 15 | 220 | 155 | 11 | 375 | 350 | 94 | 165 | 175 | 120 | 125 |
| Tol | 145 | 240 | 205 | 170 | 235 | 250 | 370 | 195 | 220 | 190 | 180 |
| T/H | 43 | 220 | 170 | 60 | 305 | 315 | 205 | 170 | 180 | 135 | 135 |
| O1 | 0.7 | 39 | 12 | −2 | 20 | 74 | 2 | 44 | 30 | 9 | 8 |
| O2 | 3 | 150 | 94 | 2 | 76 | 255 | 49 | 120 | 115 | 65 | 65 |
| H2O | 6 | 4 | 5 | 7 | 0.7 | 0.2 | 12 | 1 | 5 | 5 | 7 |
| HCl | 2 | 3 | 4 | 1 | 0.8 | 1 | 6 | 4 | 6 | 5 | 5 |
| Met | 7 | 11 | −11 | 13 | 3 | −10 | 24 | 0.6 | 12 | 13 | 15 |
| Eth | 9 | 6 | 6 | 47 | 3 | −10 | 20 | 6 | 7 | 0.8 | 8 |
| Ace | 33 | 33 | 22 | 59 | 11 | 72 | 39 | 12 | 35 | 36 | 37 |
| Dib | 30 | 39 | 67 | 185 | 2 | −4 | 24 | 47 | 42 | 45 | 61 |
| MEK | 65 | 51 | 56 | 205 | 19 | −8 | 145 | 51 | 89 | 61 | 56 |
| Car | 135 | 210 | 155 | 83 | 240 | 180 | 240 | 125 | 185 | 160 | 155 |
| Dim | 124 | 13 | 17 | 215 | 4 | −6 | 64 | 8 | 22 | 41 | 23 |
| Tet | 245 | 210 | 180 | 265 | 215 | 290 | 410 | 175 | 200 | 215 | 175 |
| Thi | 370 | 250 | 215 | 250 | 105 | 120 | 445 | 205 | 255 | 255 | 200 |

TABLE XVa

| | Sample No. | | | | | | | | | | |
|---|---|---|---|---|---|---|---|---|---|---|---|
| | 12 | 13 | 14 | 15 | 16 | 17 | 18 | 19 | 20 | 21 | 22 |
| PE | 50 | 20 | 50 | 20 | 50 | 20 | 50 | 20 | 50 | 20 | 50 |
| NR | | | | | | | | | | | |
| SBR | 50 | | | | | | | | | | |
| NI | | 80 | 50 | | | | | | | | |
| BU | | | | 80 | 50 | | | | | | |
| EPT | | | | | | 80 | 50 | | | | |
| NE | | | | | | | | 80 | 50 | | |
| PB | | | | | | | | | | 80 | 50 |

| | Volume Swell (%V) | | | | | | | | | | |
|---|---|---|---|---|---|---|---|---|---|---|---|
| Solvents: | | | | | | | | | | | |
| Hep | 57 | 240 | 120 | 110 | 73 | 10 | 10 | 360 | 175 | 61 | 61 |
| Cyc | 78 | 270 | 145 | 130 | 91 | 11 | 14 | 380 | 200 | 89 | 65 |
| Tol | 135 | 200 | 160 | 185 | 155 | 160 | 125 | 295 | 210 | 240 | 220 |
| T/H | 98 | 220 | 140 | 150 | 105 | 59 | 50 | 335 | 180 | 140 | 105 |
| O1 | 3 | 18 | 10 | 33 | 16 | −1 | −1 | 80 | 35 | 4 | 2 |
| O2 | 32 | 59 | 360 | 100 | 65 | 3 | 5 | 280 | 140 | 38 | 26 |
| H2O | 9 | 2 | 4 | 3 | 4 | 9 | 9 | 1 | 3 | 16 | 12 |
| HCl | 3 | 2 | 2 | 9 | 3 | 3 | 36 | −23 | 3 | 5 | 4 |
| Met | 13 | 6 | 9 | 5 | 7 | 5 | 6 | −6 | 0.1 | 22 | 24 |
| Eth | 13 | 6 | 7 | 6 | 7 | 38 | 23 | −6 | −0.6 | 18 | 15 |
| Ace | 29 | 16 | 24 | 18 | 25 | 53 | 42 | 15 | 25 | 42 | 52 |
| Dib | 54 | 5 | 11 | 47 | 48 | 150 | 89 | 0 | 9 | 150 | 105 |
| MEK | 55 | 21 | 34 | 45 | 55 | 170 | 115 | 2 | 19 | 105 | 91 |
| Car | 140 | 185 | 190 | 135 | 125 | 145 | 82 | 290 | 190 | 190 | 180 |
| Dim | 35 | 12 | 41 | 17 | 34 | 180 | 120 | 7 | 27 | 72 | 81 |
| Tet | 160 | 195 | 195 | 175 | 155 | 230 | 170 | 245 | 200 | 280 | 290 |
| Thi | 180 | 140 | 200 | 205 | 180 | 240 | 175 | 175 | 220 | 305 | 230 |

To compare the solvent- and hydrocarbon-resistances of the covulcanizates, two parameters were calculated:

(1)
$$A = \text{Average percent volume swell, i.e.} \frac{\text{Sum of \%V values}}{17}$$

and (2)
$$R = \frac{\%V \text{ (Polar and Heterocyclics)}}{\%V \text{ (Hydrocarbon)}}$$

that is, $$\frac{\%V \text{ (Dim)} + \%V \text{ (Tet)} + \%V \text{ (Thi)}}{\%V \text{ (Hep)} + \%V \text{ (Cyc)} + \%V \text{ (T/H)}}$$

These results are shown in Table XVI:

TABLE XVI

| Sample | Compositions (percent) | A | R |
|---|---|---|---|
| 1 | 100 PE | 73 | 10.6 |
| 2 | 100 NR | 113 | 0.71 |
| 3 | 100 SBR | 87 | 0.92 |
| 4 | 100 NI | 93 | 9.25 |
| 5 | 100 BU | 114 | 0.32 |
| 6 | 100 EPT | 130 | 0.40 |
| 7 | 100 NE | 131 | 2.39 |
| 8 | 100 PB | 79 | 0.85 |
| 9 | 20/80 PE/NR | 102 | 0.94 |
| 10 | 50/50 PE/NR | 86 | 1.42 |
| 11 | 20/80 PE/SBR | 79 | 1.12 |
| 12 | 50/50 PE/SBR | 64 | 1.61 |
| 13 | 20/80 PE/NI | 86 | 8.13 |
| 14 | 50/50 PE/NI | 62 | 6.15 |
| 15 | 20/80 PE/PB | 81 | 1.02 |
| 16 | 50/50 PE/PB | 68 | 1.37 |
| 17 | 20/80 PE/BU | 94 | 0.47 |
| 18 | 50/50 PE/BU | 97 | 1.08 |
| 19 | 20/80 PE/EPT | 143 | 0.40 |
| 20 | 50/50 PE/EPT | 96 | 0.81 |
| 21 | 20/80 PE/NE | 105 | 2.26 |
| 22 | 50/50 PE/NE | 96 | 3.34 |

It can readily be seen from these results that covulcanizates of polyepisulphides with butyl, SBR, polybutadiene and natural rubbers have solvent-resistances superior to those of the vulcanizates of the individual elastomers other than vulcanized polyepisulphide. The solvent-resistances of the covulcanizates comprising nitrile and neoprene rubbers are enhanced except for hydrocarbon solvents. However, the covulcanizates comprising greater than 60 percent of EPT show poorer solvent-resistance than the individual elastomer vulcanizates, probably because of poor blending of the elastomers.

EXAMPLE IX

This example illustrates that as little as 1 percent by weight of polyepisulphide elastomer, when incorporated into a covulcanizate with another sulphur-vulcanizable elastomer, improves the oil- and solvent-resistances of that covulcanizate over those of the vulcanizate of the individual elastomer.

The polyepisulphide used in this example comprised 69 mole percent propylene episulphide, 28 mole percent ethylene episulphide and 2.8 mole percent allyloxypropyl episulphide. The other elastomer was natural rubber.

The elastomers were blended and compounded as shown in Table XVII, all parts being parts by weight:

TABLE XVII

| | |
|---|---|
| Polymer | 100 |
| HAF Black | 50 |
| Zinc oxide | 5 |
| Stearic acid | 2 |
| Diethylene glycol | 2.5 |
| Sulphur | 2 |
| Tetramethylthiuram disulphide | 1 |
| 2-mercaptobenzthiazole | 0.5 | and vulcanized at 307° F. for 10 minutes.

The vulcanizates were placed in (a) heptane, (b) a paraffinic oil, and (c) an aromatic oil for 40 hours at 50° C. After this time the percent volume swells (%V) were measured and these results along with the compositions of the covulcanizates are shown in Table XVIII:

TABLE XVIII

| Composition, percent by weight | | %V in solvent | | |
|---|---|---|---|---|
| PE | NR | Hep | O1 | O2 |
| 0 | 100 | 240 | 59 | 163 |
| 1 | 99 | 239 | 52 | 160 |
| 10 | 90 | 224 | 53 | 153 |
| 20 | 80 | 213 | 42 | 141 |

Having now described our invention, what we claim is:

1. A vulcanized elastomeric composition comprising the sulphur vulcanizate of a mixture of:
   (a) an ethylenically unsaturated copolymer of at least one saturated aliphatic episulphide monomer and an episulphide monomer containing at least one aliphatic carbon-carbon double bond in addition to the episulphide group, the proportion of said unsaturated monomer in the copolymer being from 0.1 to 20 mole percent, and
   (b) a sulphur vulcanizable elastomer selected from the group consisting of natural rubber and diolefin polymers—the amount of said unsaturated episulphide copolymer being from 1 to 99 percent by weight of the total elastomer content of the composition.

2. A composition according to claim 1 wherein the unsaturated episulphide constitutes from 1 to 10 mole percent of the polymerization mixture.

3. A composition according to claim 1 wherein the unsaturated polymeric polyepisulphide is a terpolymer of a mixture of two saturated aliphatic episulphides and one unsaturated episulphide containing at least one carbon-carbon double bond.

4. A composition according to claim 3 wherein the two saturated aliphatic episulphides are ethylene sulphide and propylene sulphide.

5. A composition according to claim 3 wherein the two saturated aliphatic episulphides are ethylene sulphide and butylene sulphide.

6. A composition according to claim 3 wherein the terpolymer contains up to 35 mole percent of units derived from ethylene sulphide.

7. A composition according to claim 3 wherein the two saturated aliphatic episulphides are propylene sulphide and butylene sulphide.

8. A composition according to claim 1 in which the unsaturated episulphide monomer is a straight-chain aliphatic episulphide.

9. A composition according to claim 8 wherein the sulphur-vulcanizable diolefin polymer is a butyl rubber.

10. A composition according to claim 8 wherein the sulphur-vulcanizable diolefin polymer is a terpolymer of ethylene, propylene, and dicyclopentadiene.

11. A composition according to claim 8 wherein the sulphur-vulcanizable diolefin polymer is a nitrile rubber.

12. A composition according to claim 8 wherein the sulphur-vulcanizable diolefin polymer is a neoprene rubber.

13. A composition according to claim 8 wherein the sulphur-vulcanizable diolefin polymer is a copolymer of butadiene and styrene.

14. A composition according to claim 8 wherein the unsaturated episulphide is allyloxypropyl episulphide.

15. A composition according to claim 8 wherein the unsaturated episulphide is 1,5-hexadiene monoepisulphide.

16. A method of preparing the elastomeric sulphur-vulcanizate of a mixture of an unsaturated polymeric polyepisulphide containing at least one carbon-carbon double bond and a sulphur-vulcanizable natural rubber or diolefin polymer, comprising (1) blending
   (a) an ethylenically unsaturated copolymer of at least one saturated aliphatic episulphide monomer and an episulphide monomer containing at least one carbon-carbon double bond in addition to the episulphide group, the proportion of said unsaturated monomer in the copolymer being from 0.1 to 20 mole percent,
   (b) a sulphur-vulcanizable elastomer selected from the group consisting of natural rubber and diolefin polymers, the amount of the unsaturated polymeric polyepisulphide being from 1 to 99 percent by weight of the total elastomer content of the composition, and
   (c) an ingredient selected from the group consisting of sulphur and a compound which liberates sulphur under vulcanization conditions; and
(2) vulcanizing the resulting mixture by heating.

References Cited
UNITED STATES PATENTS

| | | | |
|---|---|---|---|
| 3,224,985 | 12/1965 | Gladding et al. | 260—5 |
| 3,285,804 | 11/1966 | Robinson | 260—887 |
| 2,962,457 | 11/1960 | MacKinney | 260—3 |
| 3,213,107 | 10/1965 | Bremmer | 260—79.7 |
| 3,222,326 | 12/1965 | Brodoway | 260—79.7 |

GEORGE F. LESMES, *Primary Examiner.*

MURRAY TILLMAN, *Examiner.*

M. J. TULLY, *Assistant Examiner.*